(12) United States Patent
Lin et al.

(10) Patent No.: US 7,076,137 B2
(45) Date of Patent: Jul. 11, 2006

(54) POSITIONING AND MEASURING STATION FOR PHOTOELECTRIC ELEMENTS

(75) Inventors: Yi-Xiong Lin, Hsinchu (TW); Chen-Kun Chen, Hsinchu (TW); Yu-Chen Yu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 102 days.

(21) Appl. No.: 10/765,960

(22) Filed: Jan. 29, 2004

(65) Prior Publication Data

US 2005/0078930 A1    Apr. 14, 2005

(30) Foreign Application Priority Data

Oct. 14, 2003    (TW)    ............................... 92128434 A

(51) Int. Cl.
| | |
|---|---|
| G02B 6/26 | (2006.01) |
| G02B 6/42 | (2006.01) |
| G02B 6/30 | (2006.01) |
| B23Q 3/00 | (2006.01) |
| G01C 3/02 | (2006.01) |
| G01N 21/00 | (2006.01) |

(52) U.S. Cl. ........................... 385/52; 385/49; 385/50; 385/136; 385/137; 269/320; 356/18; 356/73.1

(58) Field of Classification Search ................. 385/63, 385/88, 90, 136, 137, 52; 269/320; 356/18, 356/73.1
See application file for complete search history.

(56) References Cited

U.S. PATENT DOCUMENTS

| | | | | |
|---|---|---|---|---|
| 4,099,852 A | * | 7/1978 | Kobierecki et al. | ......... 359/814 |
| 6,271,503 B1 | * | 8/2001 | Hall et al. | ............... 219/444.1 |
| 6,288,557 B1 | | 9/2001 | Peters et al. | ................. 324/754 |
| 6,486,687 B1 | | 11/2002 | Harwood et al. | ........... 324/754 |
| 6,492,822 B1 | | 12/2002 | Schwindt et al. | ........... 324/754 |
| 6,597,432 B1 | * | 7/2003 | Ida | ............................... 355/73 |
| 6,606,444 B1 | * | 8/2003 | Harman et al. | ............. 385/137 |
| 6,654,100 B1 | * | 11/2003 | Yoda | ............................ 355/53 |
| 6,780,092 B1 | * | 8/2004 | Yi | ............................... 451/289 |
| 6,822,407 B1 | * | 11/2004 | Hunter | ....................... 318/135 |
| 6,862,080 B1 | * | 3/2005 | Matsui | ......................... 355/72 |
| 6,864,955 B1 | * | 3/2005 | Nishi et al. | .................. 355/53 |
| 6,885,430 B1 | * | 4/2005 | Tanaka et al. | ................ 355/53 |
| 2002/0027433 A1 | * | 3/2002 | Dunklee | .................. 324/158.1 |
| 2002/0129492 A1 | * | 9/2002 | Botos et al. | .................. 29/714 |
| 2002/0130560 A1 | * | 9/2002 | Botos et al. | .................. 310/12 |
| 2004/0252947 A1 | * | 12/2004 | Liu et al. | ....................... 385/52 |
| 2005/0140959 A1 | * | 6/2005 | Tsuji et al. | .................... 355/72 |

* cited by examiner

*Primary Examiner*—Brian Healy
*Assistant Examiner*—Charlie Peng
(74) *Attorney, Agent, or Firm*—Birch, Stewart, Kolasch & Birch, LLP

(57) ABSTRACT

A positioning and measuring station for photoelectric elements includes a base, a platen, a five-axis driving module and a retaining member. The platen is for holding a measuring object. The five-axis driving module is located between the base and the platen for driving the platen axially with respect to X, Y and Z axes, or rotatable on a plane or tiltable against a plane relative to the base. The retaining member is located on one side of the platen to dynamically adjust the extending distance of the platen so that the measuring object may be leaned thereon for alignment to define the holding position of the measuring object on the platen.

48 Claims, 4 Drawing Sheets

US 7,076,137 B2

POSITIONING AND MEASURING STATION FOR PHOTOELECTRIC ELEMENTS

This Nonprovisional application claims priority under 35 U.S.C. § 119(a) on Patent Application No(s). 092128434 filed in TAIWAN, R.O.C. on Oct. 14, 2003, the entire contents of which are hereby incorporated by reference.

FIELD OF THE INVENTION

The invention relates to a measurement station adapted for use in photoelectric communication industry and particularly for a positioning and measuring station to provide accurate positioning for photoelectric elements.

BACKGROUND OF THE INVENTION

With advance of photoelectric industry communication products have made significant progress. For instance, fast paced developments have appeared in the fields of wireless communication, wired communication or optical fiber communication. They have become hot prospects of future growing business and have great potentials. With fierce competition in the market place, consumer's demands on the communication systems are diversified. The elements used in the communication systems have a great impact on whether the operation of communication systems succeeds. The technology developments of the elements require matching measuring equipment and techniques to certify whether the elements and systems function properly. Thereby problems may be identified and improvements can be made.

Among the photoelectric elements, the radio frequency microwave element, radio frequency integrated circuit, and system on the chip (SOC) have the greatest potential and applicability. As the application range expands and demand grows, high frequency measurement technique and system facilities also become crucial. In the research and development of the measuring techniques, design and fabrication of the measuring station is a key that directly affects the result as well as the accuracy of the measured data.

Many techniques for fabricating the measuring station are already known in the art. For instance U.S. Pat. Nos. 6,492,822, 6,486,687 and 6,288,557 have disclosed these techniques. They provide techniques and system equipment that may be operated to achieve a certain result. However, they generally focus on the characteristics related to the fine-tuned probe and the equipment movement during measurement, or the improvement of space arrangement of the measuring equipment, or the gap between the base of the measuring equipment and the holding platen of the elements to avoid electric leakage. The holding platen is specially designed to prevent electromagnetic interference (EMI). In other words, the cited references mainly aim at providing techniques to improve signal transmission function between the probe and the measuring object.

The techniques provided by the aforementioned cited references are merely adaptable for a portion of photoelectric elements because they cannot achieve accurate optical coupling and measure every type of products. Moreover, the holding platen cannot precisely align every type of photoelectric elements being measured. Thus, accurate optical coupling is difficult to accomplish. Furthermore, since the environmental temperature cannot be adjusted dynamically to maintain the stability or the temperature cannot be adjusted to a desired condition, the aforementioned references, performance and design still have room for improvement. Particularly, the shortcoming of inaccurate optical coupling often causes erroneous measurements and makes the resulting data meaningless.

SUMMARY OF THE INVENTION

In view of the aforesaid disadvantages, the primary object of the invention is to provide a positioning and measuring station for photoelectric elements that is adaptable for a wide variety of products to perform accurate positioning.

The positioning and measuring station according to the invention mainly includes a base, a platen, a five-axis driving module and a retaining member. The platen is located on the top side of the base for holding an object to be measured. The five-axis driving module is located between the base and the platen for axially driving the platen with respect to X, Y and Z axes, or rotatable on a plane, or tiltable against a plane relative to the base. The retaining member is located on the platen to form an elevation distance with the flat surface of the platen. Moreover, the extending distance of the retaining member from the platen is dynamically adjustable; thus, every type of photoelectric elements with different sizes and heights may be accurately aligned and positioned on the platen to provide a precise coupling and measuring environment so the resulting data are thereby accurate.

The positioning and measuring station according to the invention may be adopted for use on a wide variety of photoelectric elements such as high frequency microwave element, optical communication element, semiconductor optical amplifier (SOA), distributed feedback laser (DFB laser), Fabry Perot laser (FP laser), optical modulator, and the like. Hence it not only offers a wide range of applications, but also provides an accurate element coupling mechanism and generates more accurate measurement data that are valuable to the industry. Furthermore, it has a simple structure and can be fabricated at a lower cost. All of the aforesaid can contribute to product research and development, which will move the industry to advanced levels and have products even more competitive.

The foregoing additional objects, features and advantages of the invention will be further explained with references to the accompanied drawings in the following detailed description.

DESCRIPTION OF THE PREFERRED EMBODIMENTS

The positioning and measuring station according to the invention may be adopted for use on a wide variety of photoelectric elements such as high frequency microwave element, optical communication element, semiconductor optical amplifier (SOA), distributed feedback laser (DFB laser), Fabry Perot laser (FP laser), Vertical-cavity surface-emitting laser, optical modulator, photo-detector, and the like.

Figure 1:
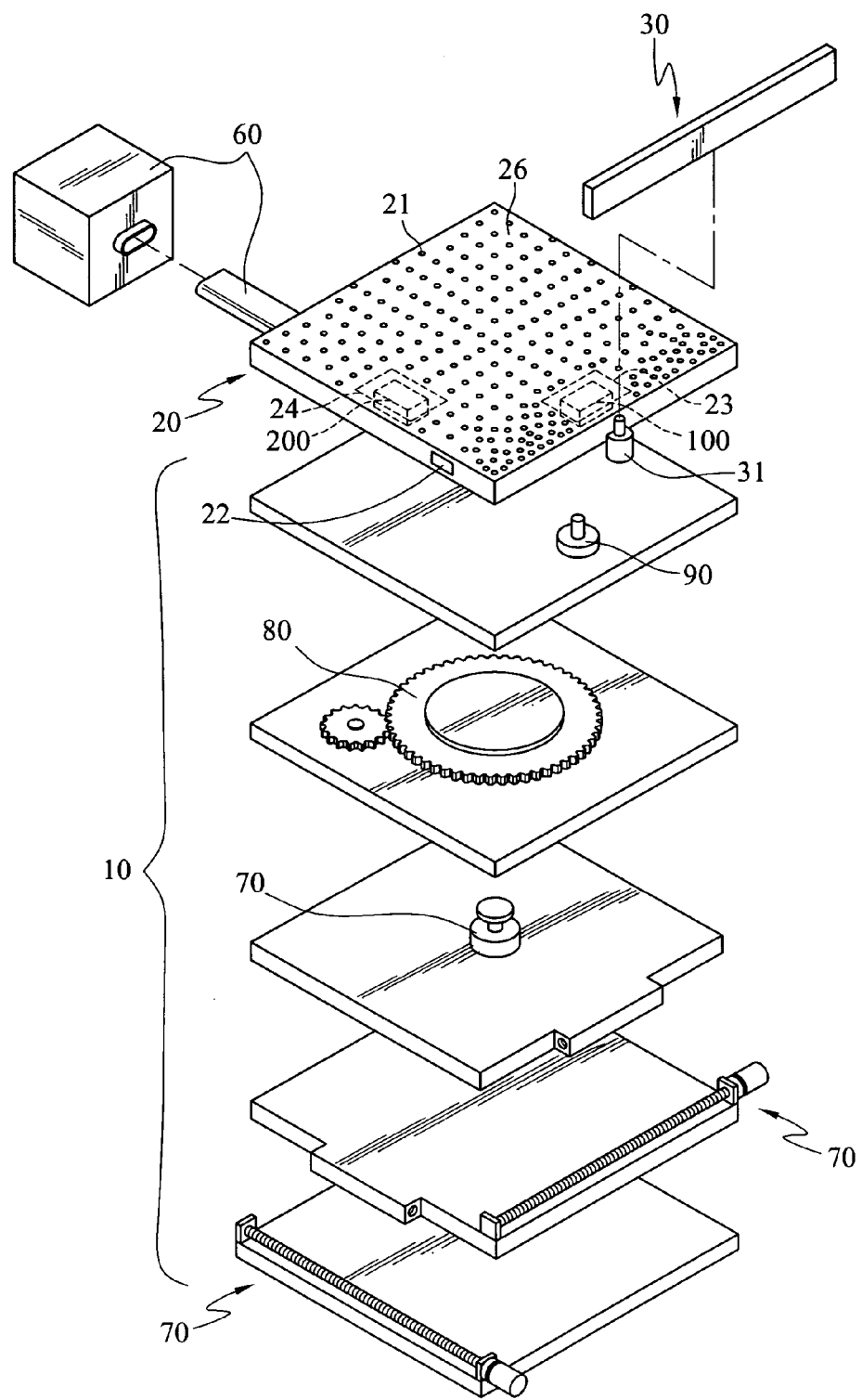
FIG. 1 is an exploded view of the positioning and measuring station for photoelectric elements according to the invention.
Figure 2:
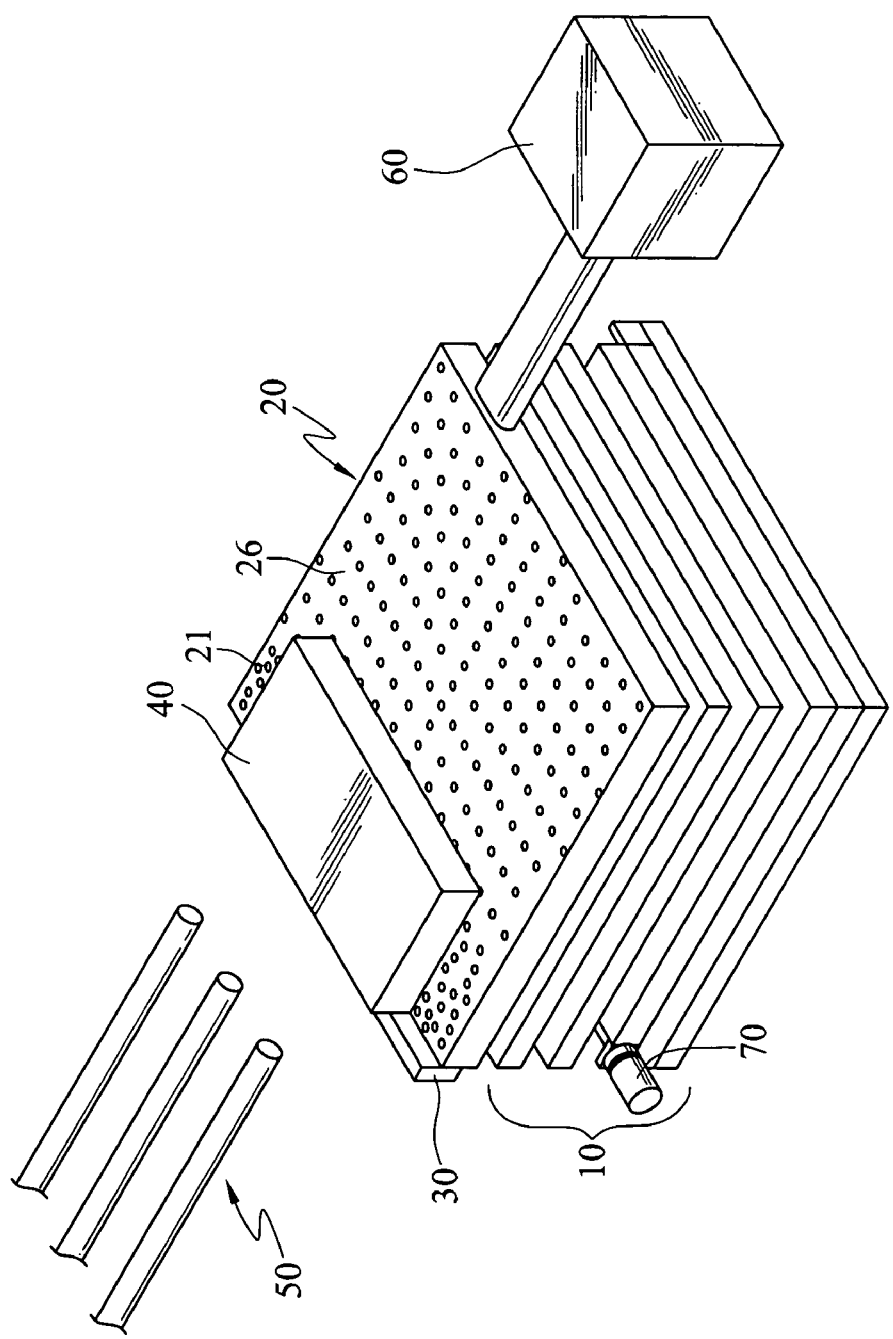
FIG. 2 is a perspective view of the positioning and measuring station for photoelectric elements according to the invention.

Referring to FIGS. 1 and 2, the positioning and measuring station according to the invention mainly includes a base 10, a platen 20, a five-axis driving module and a retaining member 30. The base 10 is made of an electric insulation material. The platen 20 has a surface plated with a sputtered conductive metal layer and is located on the top side of the base 10. It also has a flat surface 26 for holding a measuring object 40 such as the photoelectric elements mentioned above. The flat surface 26 has a plurality of suction apertures 21 communicating with a suction module 60 located on one side of the platen so that when the suction module 60 operates, it can draw air through the suction apertures 21 and enable the measuring object 40 to be attracted in contact tightly on the platen 20. The platen 20 further has a cavity 23 and a trough 24 to hold a temperature sensor 100 and a temperature regulator 200. Since the measuring object 40 is a precise photoelectric element, its performance is closely related to the temperature. Hence the temperature sensor 100 constantly monitors the operation temperature and emits signals to the temperature regulator 200 to control the temperature of the measuring environment. The temperature may also be controlled to be within a predetermined stable range to prevent erroneous measurements caused by frequent temperature fluctuations, or damages to the measuring object 40 caused by too high of temperature. The platen 20 has an electric connecting section 22 on one side to link an external electric power to the measuring object 40.

Figure 3:
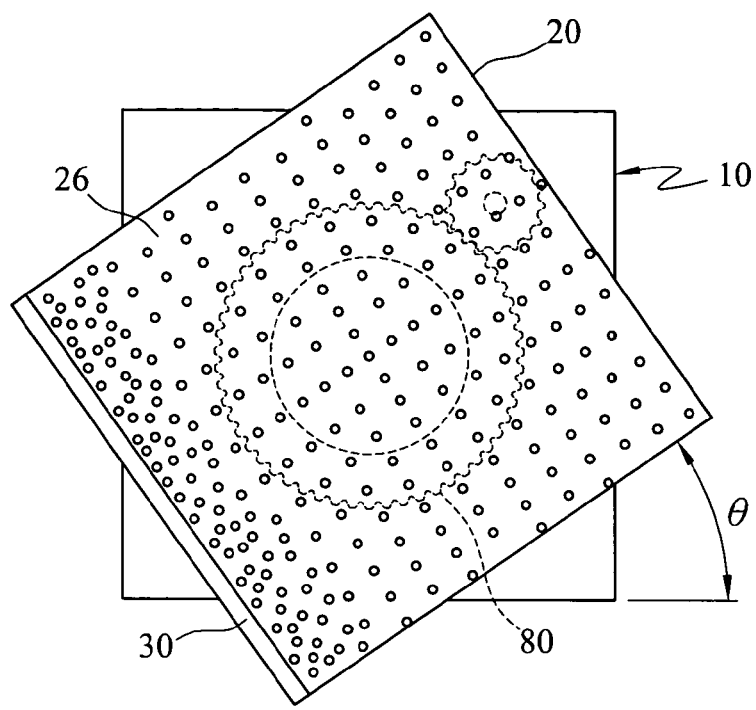
FIG. 3 is a schematic view of the positioning and measuring station of the invention in a plane rotation condition.
Figure 4:
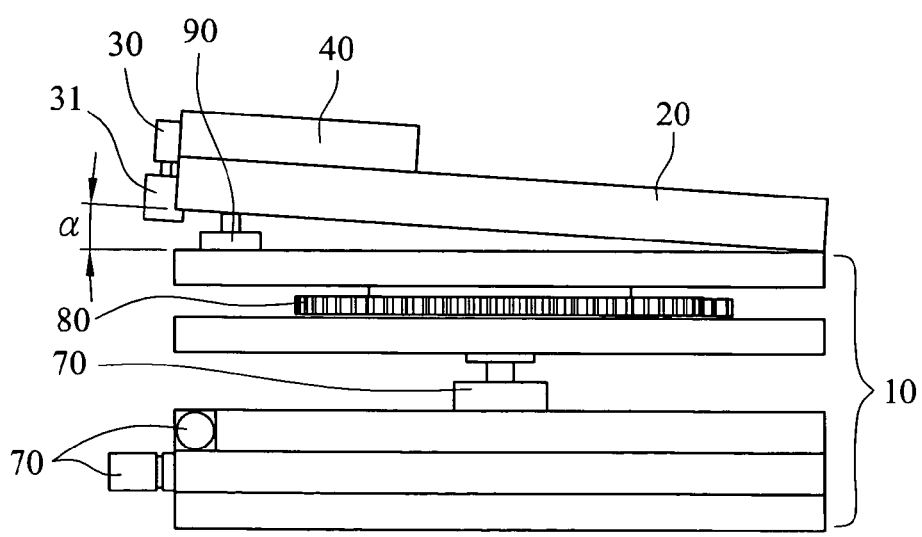
FIG. 4 is a schematic view of the positioning and measuring station of the invention in a plane inclination adjustment condition.

The five-axis driving module is located between the base 10 and the platen 20. It includes an axial driving module 70, a plane rotation driving module 80 and an inclination adjustment module 90. The axial driving module 70 aims at generating motion of the platen 20 relative to the base 10 in X, Y and Z axes. Referring to FIG. 3, the plane rotation driving module 80 may drive the platen 20 to turn horizontally relative to the base 10. The inclination adjustment module 90 is used to control the inclination angle of the platen 20 relative to the base 20 as shown in FIG. 4. The five-axis driving module aims at providing dynamic adjustment of the platen 20 according to the measuring object 40 so that the measuring object 40 may be coupled on an optical fiber 50 at an optimal position and angle depending on the types and characteristics of the measuring object 40. In other words, through an auxiliary operation of the five-axis driving module, the platen 20 may be freely adjusted to a desired angle to reach the optimal measuring position thereby obtaining data that are more accurate to meet requirements. It is to be noted that the suction apertures 21 are preferably located in the center of the flat surface 26 of the platen 20 and uniformly dispersed outwards so that an even suction force may be obtained to draw the measuring object 40 securely in contact with the platen 20. This also helps to prevent the measuring object 40 from skewing on the platen 20 during adjustment operation of the platen 20.

The retaining member 30 is located on one side of the platen 20 to couple with an elevation controller 31. The top edge of the retaining member 30 is slightly higher than the flat surface 26 of the platen 20. The elevation controller 31 can dynamically adjust the elevation of the retaining member 30 relative to the flat surface 26. The retaining member 30 aims at providing an alignment wall for the measuring object 40 to lean on so that the measuring object 40 may be positioned on the flat surface 26 at a desired location. In addition, the retaining member 30 enables the suction apertures 21 to be formed more compact, this aids the measuring object 40 to be held more securely on the platen 20 and leaned on the retaining member 30 without skewing when the platen 20 is moving so that a more accurate measuring environment is created.

Figure 5:
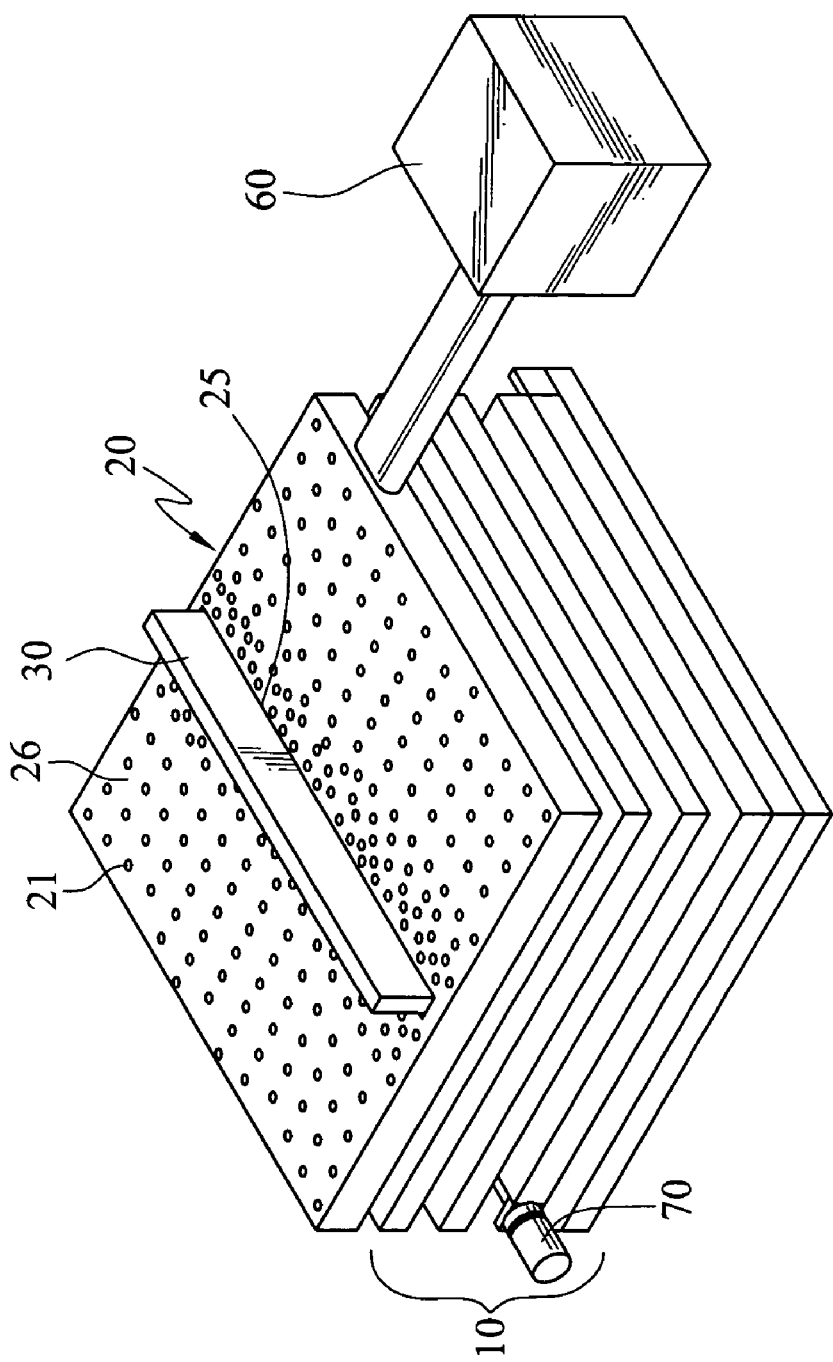
FIG. 5 is a schematic view of another embodiment of the positioning and measuring station according to the invention.

Referring to FIG. 5, the retaining member 30, aside from locating at one side of the platen 20, may be held in an elongated trough 25 formed on the platen 20 so that both sides of the retaining member 30 may hold measuring objects 40. The holding position may be adjusted according to the requirements to provide versatile measurement selections.

Based on the research data and practical measuring experiences, present products on the market, or the conventional techniques, provide only axial movement or plane rotation adjustment. Since the adjustment mechanisms do not exist on the same equipment, the measurement position of the measuring object 40 cannot be adjusted dynamically in three dimensions in the equipment. As a result, optical coupling efficiency is lowered and effective data cannot be obtained. Through the positioning and measuring station of the invention, the holding position of the measuring object 40 can be adjusted dynamically in three dimensions, and the measuring object 40 and the optical fiber 50 may be coupled as desired to enhance the optical coupling efficiency. Moreover, the retaining member 30 enables the measuring object 40 to be precisely positioned on the platen 20, and the holding position of the measuring object 40 may have a standard specification. All of the aforementioned can greatly increase the accuracy of the measured data and practicality of this invention.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A positioning and measuring station for photoelectric elements to accurately couple a measuring object with an external optical fiber, comprising:
   a base;
   a platen located on a top side of the base having a flat surface for holding the measuring object;
   a five-axis driving module located between the base and the platen to generate axial motions with respect to X, Y and Z axes, plate rotation to a selected angle, and plane inclination to another selected angle from the platen relative to the base; and
   a retaining member located on one side of the platen having a top edge higher than the flat surface to provide an alignment wall for the measuring obiect to lean on so that the holding position of the measuring object on the flat surface is defined.

2. The positioning and measuring station of claim 1 further having an elevation controller for controlling the elevation of the retaining member relative to the flat surface.

3. The positioning and measuring station of claim 1 further having a suction module located on one side of the platen.

4. The positioning and measuring station of claim 3, wherein the flat surface has a plurality of suction apertures communicating with the suction module for drawing air through the apertures when the suction module operates so that the measuring object is held tightly on the platen.

5. The positioning and measuring station of claim 4, wherein the suction apertures are abutting the retaining member.

6. The positioning and measuring station of claim 4, wherein the suction apertures are located in the center of the platen and dispersed outwards in a spaced manner.

7. The positioning and measuring station of claim 1, wherein the platen has an electric connecting section on one side thereof for receiving external electric power.

8. The positioning and measuring station of claim 1, wherein the platen has a cavity which holds a temperature sensor for measuring the temperature of the measuring environment.

9. The positioning and measuring station of claim 8, wherein the platen has a trough which holds a temperature regulator to control the temperature of the measuring environment within a selected range according to signals transmitted from the temperature sensor.

10. The positioning and measuring station of claim 1, wherein the platen has a surface plated with a sputtered conductive metal layer.

11. The positioning and measuring station of claim 1, wherein the base is made from an electric insulation material.

12. A positioning and measuring station for photoelectric elements to accurately couple a measuring object with an external optical fiber, comprising:
    a base;
    a platen located on a top side of the base having a flat surface for holding the measuring object;
    a multi-axis driving module located between the base and the platen to generate axial motions; and
    a retaining member located on the platen having a top edge higher than a flat surface to be in contact with the measuring object for defining the holding position of the measuring object on the flat surface, wherein the flat surface has an elongated trough for holding the retaining member and allowing the retaining member to be exposed outside the flat surface.

13. The positioning and measuring station of claim 12, further comprising an elevation controller for controlling the elevation of the retaining member relative to the flat surface.

14. The positioning and measuring station of claim 12, further comprising a suction module located on one side of the platen.

15. The positioning and measuring station of claim 14, wherein the flat surface has a plurality of suction apertures communicating with the suction module for drawing air through the apertures when the suction module operates so that the measuring object is held tightly on the platen.

16. The positioning and measuring station of claim 14, wherein the suction apertures are abutting the retaining member.

17. The positioning and measuring station of claim 14, wherein the suction apertures are located in the center of the platen and dispersed outwards in a spaced manner.

18. The positioning and measuring station of claim 12, wherein the platen has an electric connecting section on one side thereof for receiving external electric power.

19. The positioning and measuring station of claim 12, wherein the platen has a cavity which holds a temperature sensor for measuring the temperature of the measuring environment.

20. The positioning and measuring station of claim 19, wherein the platen has a trough which holds a temperature regulator to control the temperature of the measuring environment within a selected range according to signals transmitted from the temperature sensor.

21. The positioning and measuring station of claim 12, wherein the platen has a surface plated with a sputtered conductive metal layer.

22. The positioning and measuring station of claim 12, wherein the base is made form an electric insulation material.

23. The positioning and measuring station of claim 12, wherein the module can generate axial motions with respect to X, Y and Z axes, platen rotation to a selected angle, and plane inclination to another selected angle from the platen relative to the base.

24. A positioning and measuring station for photoelectric elements to accurately couple a measuring object with an external optical fiber, comprising:
    a base;
    a platen located on a top side of the base having a flat surface for holding the measuring object;
    a multi-axis driving module located between the base and the platen to generate axial motions; and
    a retaining member located on the platen having a top edge higher than a flat surface to be in contact with the measuring object for defining the holding position of the measuring object on the flat surface;
    wherein the platen has a cavity which holds a temperature sensor for measuring the temperature of the measuring environment.

25. The positioning and measuring station of claim 24, further comprising an elevation controller for controlling the elevation of the retaining member relative to the flat surface.

26. The positioning and measuring station of claim 24, further comprising a suction module located on one side of the platen.

27. The positioning and measuring station of claim 26, wherein the flat surface has a plurality of suction apertures communicating with the suction module for drawing air through the apertures when the suction module operates so that the measuring object is held tightly on the platen.

28. The positioning and measuring station of claim 26, wherein the suction apertures are abutting the retaining member.

29. The positioning and measuring station of claim 26, wherein the suction apertures are located in the center of the platen and dispersed outwards in a spaced manner.

30. The positioning and measuring station of claim 24, wherein the platen has an electric connecting section on one side thereof for receiving external electric power.

31. The positioning and measuring station of claim 24, wherein the platen has a trough which holds a temperature regulator to control the temperature of the measuring environment within a selected range according to signals transmitted from the temperature sensor.

32. The positioning and measuring station of claim 24, wherein the platen has a surface plated with a sputtered conductive metal layer.

33. The positioning and measuring station of claim 24, wherein the base is made form an electric insulation material.

34. The positioning and measuring station of claim 24, wherein the module can generate axial motions with respect to X, Y and Z axes, platen rotation to a selected angle, and plane inclination to another selected angle from the platen relative to the base.

35. The positioning and measuring station of claim 24, wherein the retaining member is located on one side of the platen.

36. The positioning and measuring station of claim 24, wherein the flat surface has an elongated trough for holding the retaining member and allowing the retaining member to be exposed outside the flat surface.

37. A positioning and measuring station for photoelectric elements to accurately couple a measuring object with an external optical fiber comprising:
 a base;
 a platen located on a top side of the base having a flat surface for holding the measuring object;
 a multi-axis driving module located between the base and the platen to generate axial motions; and
 a retaining member located on one side of the platen having a top edge higher than the flat surface to provide an alignment wall for the measuring objected to lean on so that the holding position of the measuring object on the flat surface is defined.

38. The positioning and measuring station of claim 37, further comprising an elevation controller for controlling the elevation of the retaining member relative to the flat surface.

39. The positioning and measuring station of claim 37, further comprising a suction module located on one side of the platen.

40. The positioning and measuring station of claim 39, wherein the flat surface has a plurality of suction apertures communicating with the suction module for drawing air through the apertures when the suction module operates so that the measuring object is held tightly on the platen.

41. The positioning and measuring station of claim 40, wherein the suction apertures are abutting the retaining member.

42. The positioning and measuring station of claim 40, wherein the suction apertures are located in the center of the platen and dispersed outwards in a spaced manner.

43. The positioning and measuring station of claim 37, wherein the platen has an electric connecting section on one side thereof for receiving external electric power.

44. The positioning and measuring station of claim 37, wherein the platen has a cavity which holds a temperature regulator sensor for measuring the temperature of the measuring environment.

45. The positioning and measuring station of claim 44, wherein the platen has a trough which holds a temperature regulator to control the temperature of the measuring environment within a selected range according to signals transmitted from the temperature sensor.

46. The positioning and measuring station of claim 37, wherein the platen has a surface plated with a sputtered conductive metal layer.

47. The positioning and measuring station of claim 37, wherein the base is made form an electric insulation material.

48. The positioning and measuring station of claim 37, wherein the multi-axis driving module can generate axial motions with respect to X, Y and Z axes, platen rotation to a selected angle, and plane inclination to another selected angle from the platen relative to the base.

* * * * *